(12) United States Patent
Borghese et al.

(10) Patent No.: US 12,711,792 B1
(45) Date of Patent: Aug. 18, 2026

(54) TECHNIQUES FOR OBJECT IDENTIFICATION

(71) Applicant: THE HUNTINGTON NATIONAL BANK, Columbus, OH (US)

(72) Inventors: Beth Borghese, Columbus, OH (US); Cathalynn M. Thompson, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/292,471

(22) Filed: Aug. 6, 2025

(51) Int. Cl.
*G06V 20/00* (2022.01)
*G06V 10/74* (2022.01)
*G06V 10/774* (2022.01)

(52) U.S. Cl.
CPC .............. *G06V 20/95* (2022.01); *G06V 10/74* (2022.01); *G06V 10/774* (2022.01)

(58) Field of Classification Search
CPC ....... G06V 20/95; G06V 10/74; G06V 10/774
See application file for complete search history.

(56) References Cited

U.S. PATENT DOCUMENTS

2022/0075882 A1* 3/2022 Young ...................... H04L 63/20
2022/0294894 A1* 9/2022 Hefetz ................... G06Q 20/20
2024/0104951 A1* 3/2024 Gu ....................... G06V 30/412
2026/0024090 A1* 1/2026 Vitucci .............. G06Q 20/4016
2026/0044786 A1* 2/2026 Zhang .................. G06Q 20/042

FOREIGN PATENT DOCUMENTS

CN 112883953 A * 6/2021 ............. G06N 3/045
JP 2022171982 A * 11/2022

* cited by examiner

*Primary Examiner* — Stephen R Koziol
(74) *Attorney, Agent, or Firm* — Kilpatrick Townsend & Stockton LLP

(57) ABSTRACT

In some implementations, the techniques may include capturing an image that includes a depiction of an authorization card. The techniques may include providing the image as an input to the machine learning model. Moreover, the techniques may include receiving information that identifies the authorization card as output from the machine learning model. Also, the techniques may include comparing the information that identifies the authorization card to one or more criteria. Further, the techniques may include performing an operation based at least in part on the comparing of the information that identifies the authorization card to the one or more criteria. In addition, the techniques may include performing an operation based at least in part on comparing the information that identifies the authorization card to the one or more criteria.

20 Claims, 8 Drawing Sheets

TECHNIQUES FOR OBJECT IDENTIFICATION

TECHNICAL FIELD

The disclosure is generally directed to machine learning models. Specifically, the disclosure is directed to techniques for generating input to machine learning models for object identification.

BACKGROUND

Machine learning models can be used to identify objects, and a model may be used to identify a particular authorization card in an image. Training a model to identify authorization cards can be challenging because it may be difficult to obtain a sufficient amount of data for model training. Accordingly, improvements to object identification techniques are desirable.

BRIEF SUMMARY

In some implementations, the techniques may include capturing an image that includes a depiction of an authorization card. The techniques may include providing the image as an input to the machine learning model. Moreover, the techniques may include receiving information that identifies the authorization card as output from the machine learning model. Also, the techniques may include comparing the information that identifies the authorization card to one or more criteria. Further, the techniques may include performing an operation based at least in part on the comparing of the information that identifies the authorization card to the one or more criteria. In addition, the techniques may include performing an operation based at least in part on comparing the information that identifies the authorization card to the one or more criteria.

Implementations of these techniques can include corresponding methods, computer systems, apparatus, and computer programs recorded on one or more transitory or non-transitory computer storage devices (e.g., computer-readable media), each configured to perform the actions of the techniques.

BRIEF DESCRIPTION OF THE DRAWINGS

Various embodiments in accordance with the present disclosure will be described with reference to the drawings, in which.

DETAILED DESCRIPTION

Figure 1:
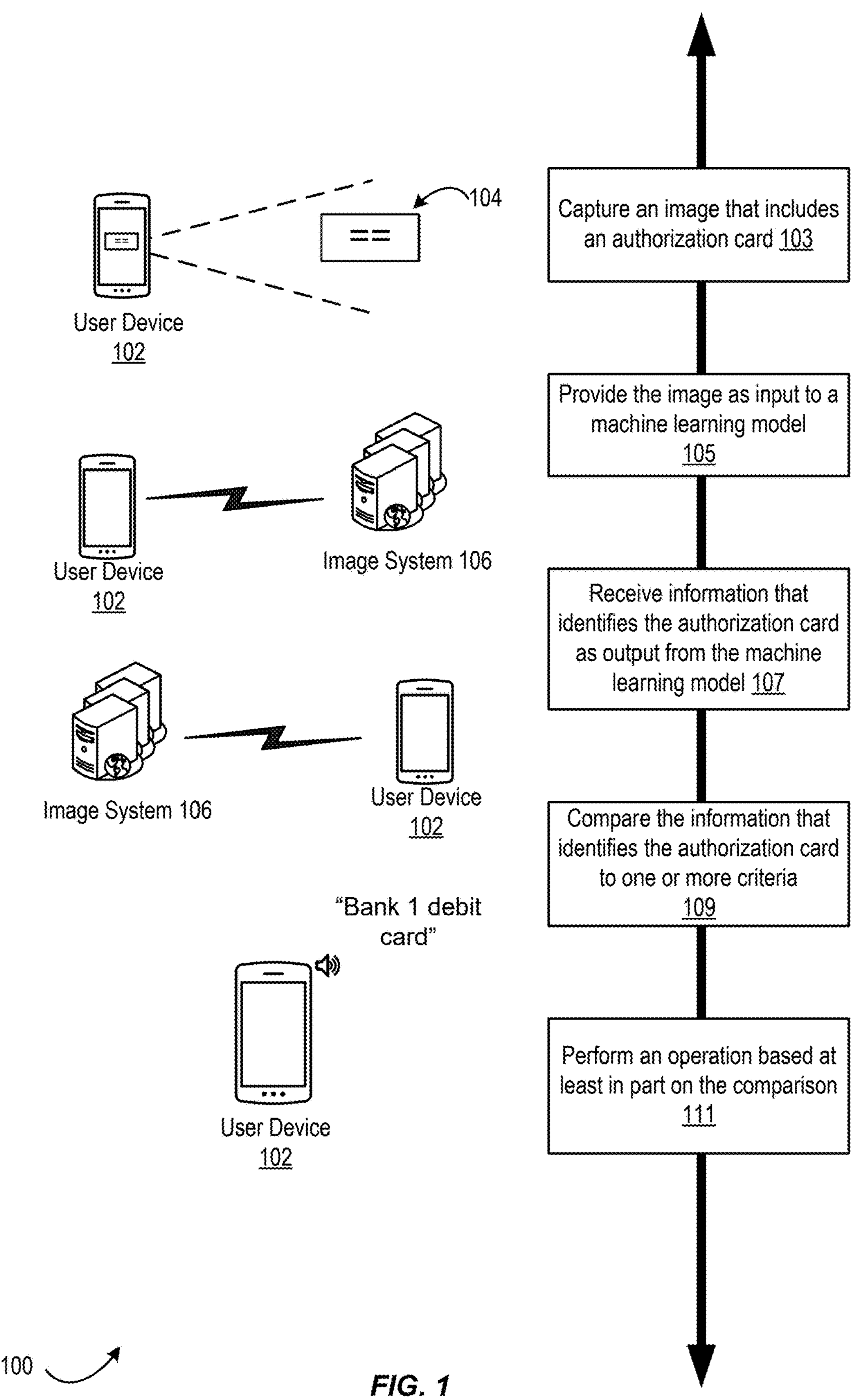
FIG. 1 is an example flow for object identification, in accordance with at least one embodiment.

In the following description, various embodiments will be described. For purposes of explanation, specific configurations, and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to techniques for classifying images based on an authorization card that is depicted in each image. The images, or information about the images, can be input into a machine learning model, and the machine learning model can use the input information to identify objects that are depicted in the image. The objects can be an authorization card such as a credit card, a debit card, a rewards card, and/or a membership card.

The machine learning model may be used to assist a visually impaired user. Individuals with visual impairments traditionally rely on assistance from others to determine a particular authorization card when making a purchase or otherwise using a card to authorize activity. This reliance can mean that visually impaired individuals are vulnerable because they rely on strangers who may attempt to record sensitive information from an authorization card. For example, an individual may attempt to discretely record payment information from a debit card.

A sufficient amount of training data may be needed to train a machine learning model, and training data for authorization cards can be difficult to acquire. The training data can include an image that depicts an authorization card and a label for the card. However, individuals may be reluctant to share images of their authorization cards because these cards may include sensitive information. For example, a bank card may include information that can be used to authorize purchases such as a card number, expiration date, and/or a card security code. The cardholder may be reluctant to share an image of this card out of fear that the card could be used to make unauthorized purchases.

Training data may be easier to acquire if the authorization cards can be anonymized. For example, the training data can be provided as a feature vector that represents the properties of an authorization image. A model can use the feature vector for training, but the feature vector could not be used to reconstruct the original image. In some embodiments, the training data can be provided to a model training system (e.g., an image system) as a feature vector, and providing training data in this manner would improve the system's data security. In addition, a feature vector can represent an image with less data than the original image, and these techniques would improve the system's functioning by reducing storage and network requirements.

The information about an image may be represented as an ordered list of numeric representations of the image's properties (e.g., an n-dimensional feature vector). The machine learning model can plot the feature vectors in an n-dimensional embedded space (e.g., feature space) where each axis in the space corresponds to one of the image's n properties. The image may be classified as including a depiction of a particular authorization card on where the feature vector is plotted in feature space. For example, the model may assign a confidence score to the image's feature vector, and the confidence score may depend on how closely the feature vector is plotted near known feature vectors that correspond to images with known quantities. The confidence score may be higher if the feature vector is plotted near known feature vectors (e.g., the Euclidian distance is close), and the confidence score may be lower if the feature vector is plotted away from known feature vectors (e.g., the Euclidian distance is far apart).

Training data can be provided during a registration procedure. For example, the registration procedure may include providing images of authorization cards that a user would like to identify. These images can be labeled by a user (e.g., via an interface) and the labeled images can be used to train a machine learning model. The images, or information representing the images such as feature vectors, may be provided using an application that is executing on a mobile device.

In an illustrative example, an individual may begin a registration procedure using their mobile device. During the procedure, an application executing on the device presents the individual with an interface for registering authorization cards. The interface's audio and visual prompts instruct the individual to hold the mobile device so that the camera is pointed at the authorization card. In this case, the authorization card is initially not in focus and the interface periodically informs the individual to move the camera because no card has been detected. After moving the camera, the application detects that the card is in frame and an image is captured. The interface then prompts the individual to provide a label for the card. The individual continues this procedure until a sufficient number of images has been captured. The mobile device generates feature vectors for each image and transmits the vectors to an image service for model training. The application also associates the feature vector for the image with the label.

At a later point, the individual accesses the application during checkout at a grocery store. The application interface prompts the user to identify a target card using a label that was provided at registration. In this case, the user provides a spoken request for "the travel rewards credit card." The user presents a first card to the mobile device's camera and the application captures an image of the first card. The model detects that the image shows a debit card and the interface prompts the user to present a second card to the camera. After a second image is automatically captured, the model identifies the second card as the travel rewards card, and the interface indicates that the current card is the target card. The user then uses the travel rewards card to complete her purchase.

The disclosed techniques can improve the functioning of a computer system. For example, techniques can be used to reduce the amount of training data that is needed to train a model. For example, one or more transformations can be performed on the training data to create modified views of the original data. The modified training data can increase the size of the training dataset, and these techniques can allow a model to be trained with less training data. The transformations can include geometric transformations, color space transformations, and randomizing transformations.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for object identification in accordance with at least one embodiment. The operations discussed in connection with FIG. 1 may be performed with any combination of a user device 102 and an image system 106. In some embodiments, any combination of the user device 102 and the image system 106 may be implemented by one or more computer(s), as a service, within an application, or the like. The user device 102 can be a mobile device and the operations may be performed on a mobile device. The operations discussed in connection with FIG. 1 may be performed in any suitable order. More or fewer operations than those depicted in FIG. 1 may be employed without diverting from this disclosure.

The flow 100 may begin at 103, and the user device 102 can capture an image. The image can include a representation of an authorization card 104 that is captured by a camera of the user device 102. The authorization card can be any one of a credit card, a bank card, a gift card, an identification card, an access credential card, and/or any other suitable authorization card. The image may be automatically captured by the mobile device using image recognition techniques (e.g., the camera is triggered in response to detecting that a card is in the image frame). The mobile device may generate information that represents the image such as a feature vector.

At 105, the image can be provided as input to a machine learning model. In some circumstances, the image can be provided as information that represents the image. The model may execute on the user device 102 and the image can be provided to the machine learning model at the user device 102. In some embodiments, the machine learning model may execute on image system 106, and the image can be communicated from the user device 102 to the image system 106. The image of the authorization card 104 can be communicated to the image system 106 over a network (e.g., the Internet). The user device 102 may compare the image captured at 103 against one or more criteria to determine whether to provide the image as input to the machine learning model. The comparison may improve the functioning of a computer system by reducing network traffic. The user device 102 may locally compare the image against the criteria, and the image may not be transmitted when the image does not satisfy criteria for input to the machine learning model. For example, the one or more criteria may include criteria for any number of any combination of resolution, contrast, noise, dynamic range, and distortion. The user device 102 may therefore only transmit images that satisfy the criteria. Images that fail the criteria, and may be unsuitable for input to the model, may not be transmitted over the network. Therefore, network bandwidth and the computer system's memory utilization can be improved by reducing the amount of unsuitable images that are transmitted over the network.

At 107, the user device 102 may receive information that identifies the authorization card. The information may be received as output from the machine learning model. The information may be received from a model executing on the user device 102 or from the image system 106. For example, the image system 106 may generate information by inputting the image from 105 into a machine-learning model. In some embodiments, the image system 106 or the user device 102 may create a feature vector for the image, and the feature vector can be input to the machine learning model. The information that identifies the authorization card may include an identifier for the card that was assigned to the card by the user (e.g., via a user interface of the user device 102), an account that is associated with the card, and/or one or more visual characteristics of the card.

At 109, the information that identifies the authorization card can be compared to one or more criteria. The criteria may include a mapping of cards to identifiers. For example, the user may assign nicknames (e.g., identifiers) to the cards via a user interface of the user device 102. In some embodiments, the identifiers may be provided to the user device 102 as labels for images of the authorization card, and a machine learning model may be trained to assign the label to an image that depicts the card. The criteria may include a target card, and, for example, the user may identify the target card via a user interface of the user device 102. The user or an application on the user device 102 may specify a target card for one or more target locations. For example, the target locations may be branch or ATM locations for a particular bank and the target card may be a bank card that is associated with the bank. In some embodiments, the target locations may be particular stores or categories of stores (e.g., grocery stores), and the user may provide information that associates authorization cards and locations via a user interface of the user device 102 (e.g., a graphical user interface and/or an auditory user interface).

At 111, the user device 102 can perform an operation based at least in part on the comparison at 109. For example, the operation may include providing a notification via a speaker of the user device 102, and the notification can be an auditory notification that identifies the card. The notification may indicate that the image does not depict an authorization card or that the image depicts an authorization card that is not recognized. The notification may indicate that the authorization card that is depicted in the image is the target card or that the depicted card is not the target card. The notification may prompt a user of the user device 102 to capture an image of a different authorization card.

In some embodiments, the operations may include presenting an option for establishing a communication channel. The communication channel can be a call to an user who can verify that the quantity returned by the image system 106 is accurate. For example, the user device 102 can determine, based on the comparison at 109, that the device should present an option to establish the communication channel because there is reason to doubt the accuracy of the quantity returned by the image system 106. The user device 102 can present the option via a graphical user interface, via an audio interface, or both a graphical user interface and an audio interface.

Figure 2:
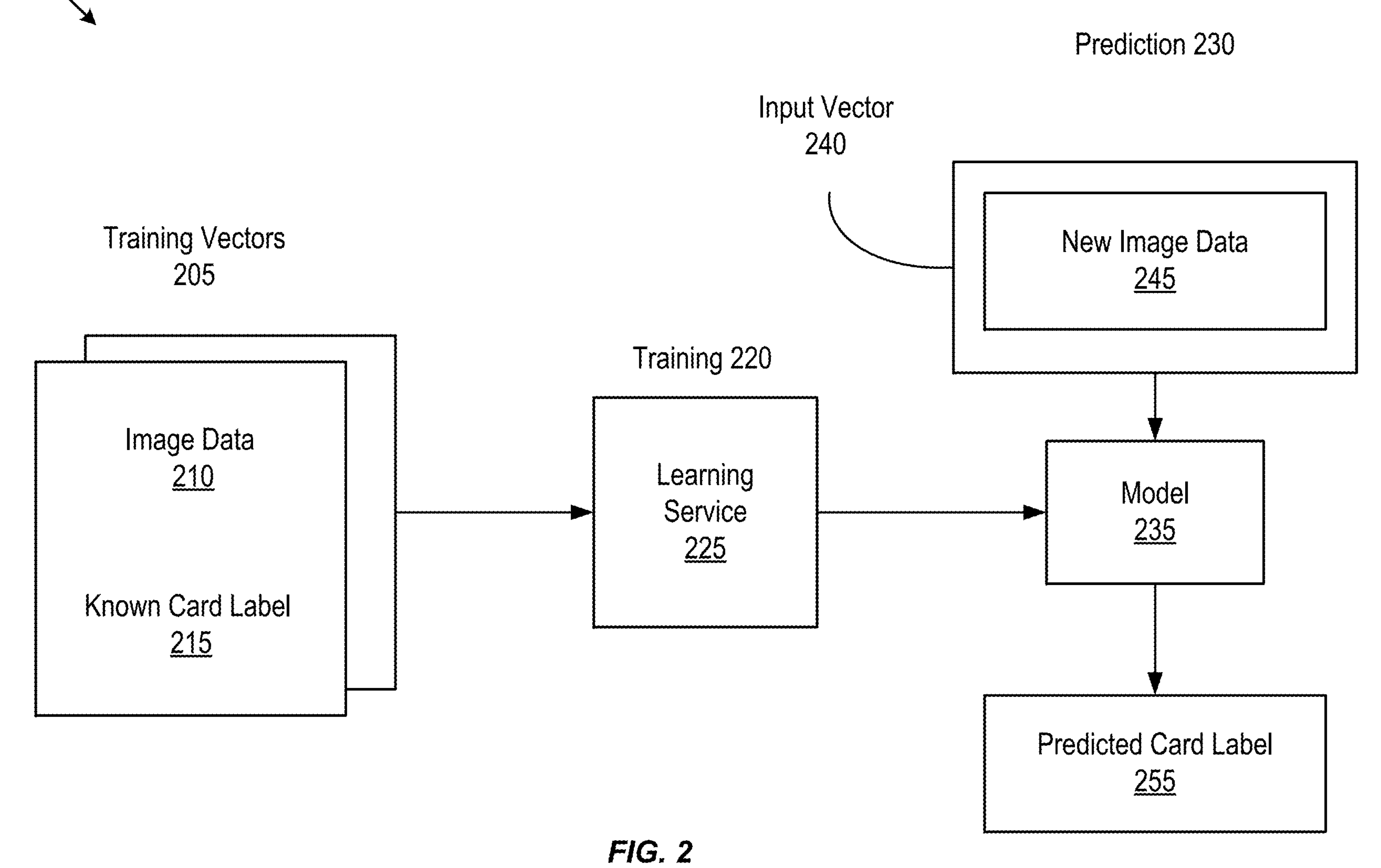
FIG. 2 shows a technique for training a machine learning model according to at least one embodiment.

FIG. 2 depicts an architecture for training a machine learning model according to the embodiments of the present disclosure. This architecture can be part of the image system 106 described above with respect to FIG. 1. The machine learning model can be trained to classify image data (e.g., an image or information representing an image) as corresponding to a particular authorization card as described above in step 107. Training vectors 205 are shown with image data 210 and a known card label 215. The image data 210 can include any information about an image as described herein. For ease of illustration, only two training vectors are shown, but the number of training vectors may be much larger, e.g., 10, 20, 100, 1,000, 10,000, 100,000, or more. Training vectors (e.g., feature vectors) could be made for any combination of different image data over the same time period, the same image data over different time periods.

The image data 210 has property fields that can correspond to the image data received at the image system (e.g., image system 400) during a time period and the skilled person will appreciate the various ways that such data can be configured. The known card label 215 includes a label for an authorization card that is depicted in the image data 210. The known card label 215 can be a user assigned label, and, for example, a user may provide labeled images that can be used to train the machine learning model.

The training vectors 205 can be used by a learning service 225 to perform training 220. A service, such as the learning service 225, is one or more computing devices configured to execute computer code to perform one or more operations that make up the service. The learning service 225 can optimize the parameters of the model 235 such that a quality metric (e.g., the accuracy of model 235) is achieved with one or more specified criteria. The accuracy may be measured by comparing the known card label(s) 215 to the predicted card label(s) 255. Parameters of the model 235 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measure of how accurate the current state of the machine learning model is. The gradient can be used in conjunction with a learning step (e.g., a measure of how much the parameters of the model should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or the cost function does not change significantly for several time steps, as examples. In other embodiments, training can be implemented with methods that do not require a hessian or gradient calculation, such as dynamic programming or evolutionary algorithms.

A prediction stage 230 can provide a predicted card label 255 for a new image's image input vector 240 based on the new image data 245. The predicted card label 255 can be a label for an authorization card that depicted in the image data that corresponds to the input vector 240. The new image data 245 can be of a similar type as image data 210. If new image data 245 values are of a different type, a transformation can be performed on the data to obtain data in a similar format as image data 210. Ideally, the predicted card label 255 corresponds to the true amount of currency for the input vector 240.

A "machine learning model" (ML model) can refer to a software engine configured to be run on one or more processors to provide a classification or numerical value of a property of one or more samples. An ML model can be generated using sample data (e.g., training data) to make predictions on test data. One example is an unsupervised learning model. Another example type of model is supervised learning which can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, sub-symbolic machine learning algorithms, minimum complexity machines (MCM), random forests, ensembles of classifiers, ordinal classification, data preprocessing, handling imbalanced datasets, statistical relational learning, or Proaftn, a multicriteria classification algorithm. The model may include linear regression, logistic regression, deep recurrent neural network (e.g., long short-term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ wide and tensorized deep architectures, convolutional layers, dropout, various neural activations, and regularization steps.

Figure 3:
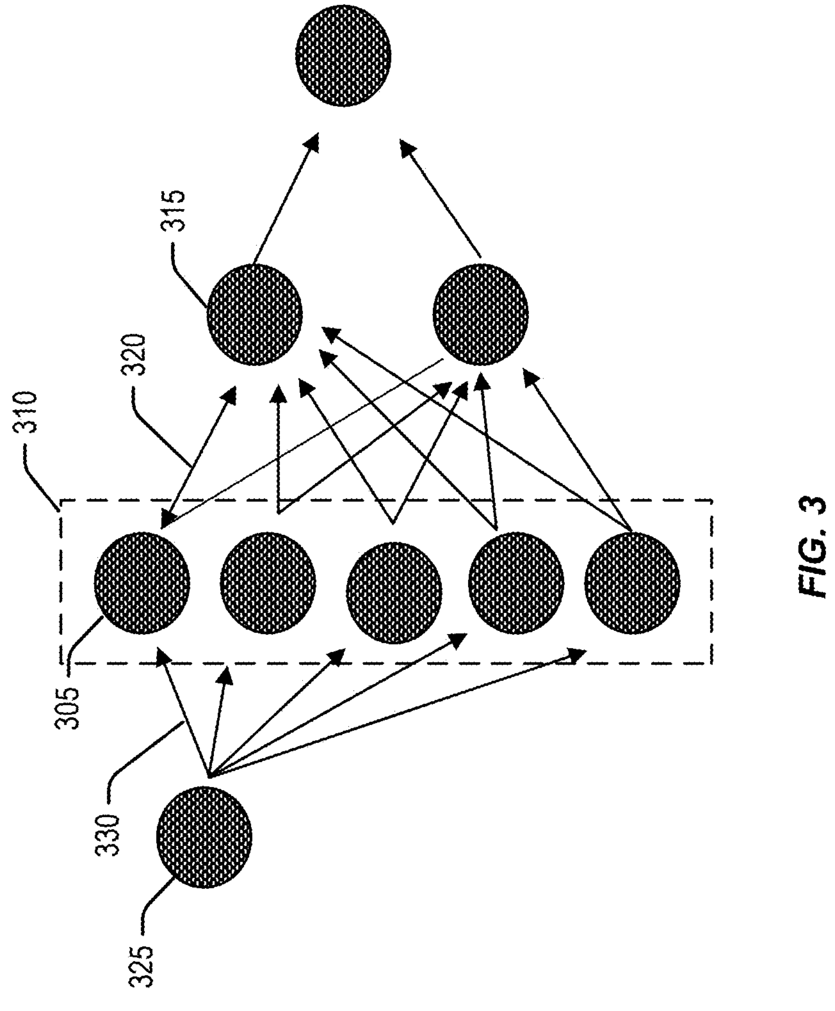
FIG. 3 shows an example machine learning model of a neural network according to at least one embodiment.

FIG. 3 shows an example machine learning model of a neural network, according to at least one embodiment. As an example, the machine learning model can be a neural network that includes a number of neurons (e.g., Adaptive basis functions) organized in layers. The machine learning model can be an example of a machine learning model that can be trained using Architecture 200. For example, a neuron 305 can be part of a layer 310. The neurons can be connected by edges between neurons. For example, the neuron 305 can be connected to a neuron 315 by an edge 320. A neuron can be connected to any number of different neurons in any number of layers. For instance, the neuron 305 can be connected to a neuron 325 by an edge 330 in addition to being connected to the neuron 315.

The training of the neural network can iteratively search for the best configuration of the parameter of the neural network for feature recognition and prediction performance. Various numbers of layers and nodes may be used. A person with skills in the art can easily recognize variations in a neural network design and design of other machine learning models. For example, neural networks can include graph neural networks that are configured to operate on unstructured data. A graph neural network can receive a graph (e.g., nodes connected by edges) as an input to the model and the graph neural network can learn the features of this input through pairwise message passing. In pairwise message passing, nodes exchange information, and each node iteratively updates its representation based on the passed information.

Figure 4:
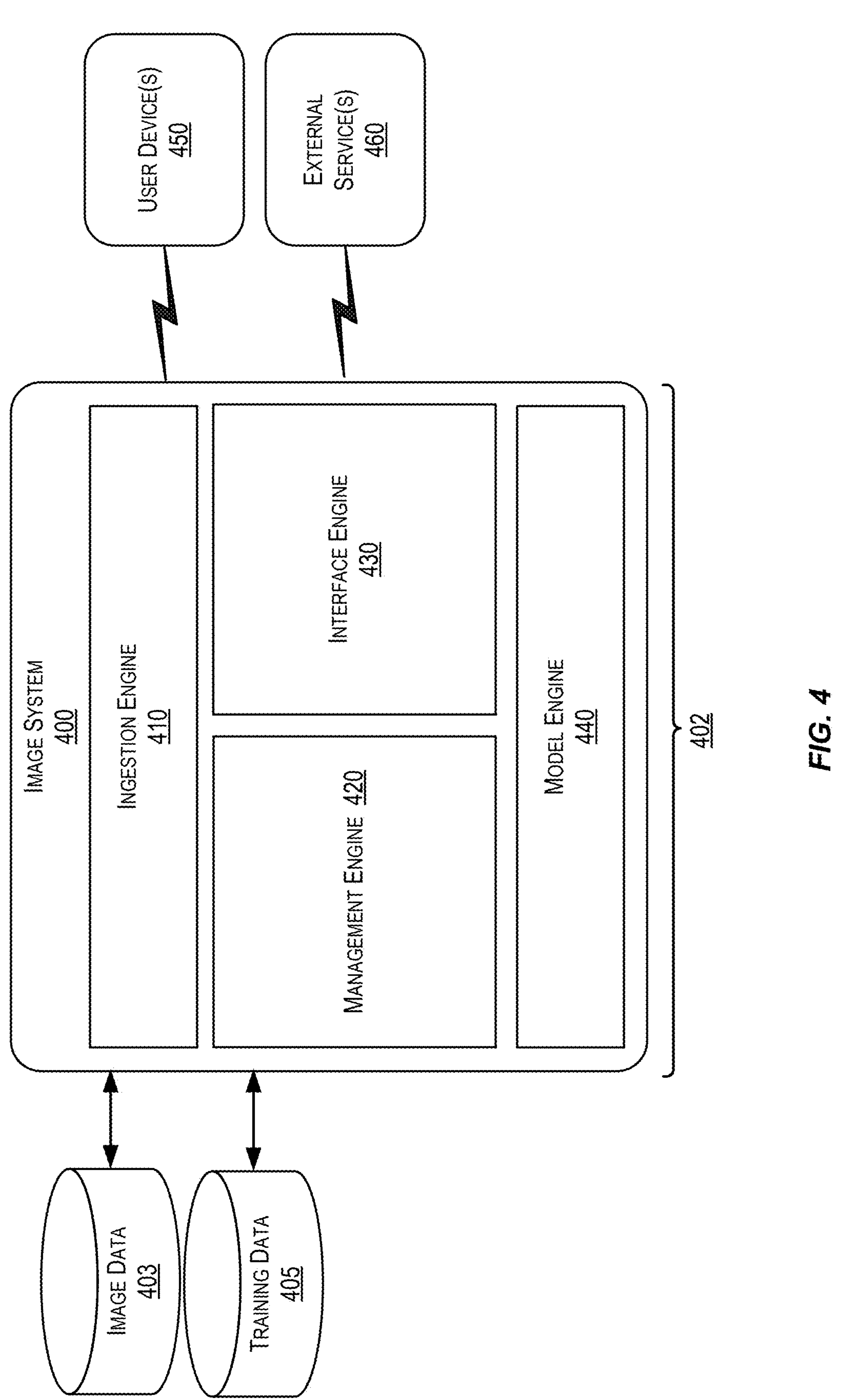
FIG. 4 is a schematic diagram of an example computer architecture for the image system, including a plurality of engines that may perform functions in accordance with at least one embodiment.

FIG. 4 is a schematic diagram of an example computer architecture for the image system 400, including a plurality of engines 402 that may perform functions in accordance with at least one embodiment. The plurality of engines 402 can include any combination of any number of an ingestion engine 410, a management engine 420, an interface engine 430, and a model engine 440. The engines 402 may be software engines, hardware engines, or a combination thereof. If the engines are software engines, the engines can be embodied on a computer-readable medium and processed by a processor in any of the computer systems described herein. It should be noted that any engine or data store described herein, may be, in some embodiments, a service responsible for providing functionality corresponding to the engine described below. The engines 402 may be executed as part of the image system 400, or the engines 402 may exist as separate engines or services external to the image system 400. Image system 400 is an example of the image system 106. In some embodiments, the engines 402 may be executed by the same or different computing devices, as a service, as an application, or the like. The image system 400 may execute on a mobile device such as user device 102 or computing device 800 in various embodiments.

In the embodiment shown in FIG. 4, data stores such as image data 403 and training data 405 are shown, although data can be maintained, derived, or otherwise accessed from various data stores, either remote or local to the image system 400, to achieve the functions described herein. The image system 400, as shown in FIG. 4, includes various engines such as an ingestion engine 410, a management engine 420, an interface engine 430, and a model engine 440. The image system can communicate information to and from user device(s) 450 and/or external service 460. Some functions of the engines 410-440 and external service 460 are described below. However, for the benefit of the reader, a brief, non-limiting description of each of the engines and systems is provided in the following paragraphs. In accordance with at least one embodiment, a process for filtering and communicating entity record data is provided.

In at least one embodiment, the image system 400 includes the ingestion engine 410. Generally, the ingestion engine 410 may be utilized to receive any suitable information with respect to any example provided herein. By way of example, the ingestion engine 410 may be configured to receive images or image information (e.g., image data). The image data may be received from one or more user devices 450. If necessary, the image data may be stored as image data 403 and accessed by the ingestion engine 410.

The ingestion engine 410 may ingest the entity data by cleaning, processing, or otherwise transforming the image data 403, and the ingestion engine 410 can use the ingested entity data to update or create new training data 405. Ingesting the image data 403 can include removing duplicate data, changing data from one format to another (e.g., changing an image file type), correcting corrupted data entries, removing unnecessary data, or otherwise making the image data 403 suitable for use by the other engines 402.

In at least one embodiment, the image system 400 includes the management engine 420. Generally, the management engine 420 may be utilized to organize and associate the image data 403 and training data 405. For example, the management engine 420 can use the image data 403 to create or update (e.g., change) the training data 405, and the management engine 420 can sort the training data into sets or subsets of training data based on any applicable criteria. For example, the management engine can create sets of training data for different authorization cards, different authorization card types, images that do not depict authorization cards, or different image properties (e.g., different image brightness). The sets or subsets of training data can be stored as training data 405. The management engine 420 may transform the image data to generate sets of training data and the transformations may include any combination of any number of mirroring, rotating, smoothing, and contrast reduction.

The management engine 420 can use transformations to transform the image data, and the transformations can include geometric transformations, color space transformations, and randomizing transformations. Any combination of any number of these transformations can be performed on an authorization card image. Geometric transformations can include rotating an image by different angles, flipping an image along an axis, cropping portions of an image, translating an image by shifting the image's position, and/or scaling an image to change its size. Color space transformations can include changing the brightness of an image, increasing the contrast of an image, reducing the contrast of an image, increasing the saturation of the image's colors, and/or decreasing the saturation of the image's colors. Randomizing transformations can include adding random noise to an image, reducing the noise in an image (e.g., smoothing), combining portions of one or more images, and/or randomly erasing a portion of the image.

In at least one embodiment, the image system 400 includes the interface engine 430. Generally, the interface engine 430 may be utilized to generate graphical user interfaces, provide the graphical user interfaces to client devices (e.g., to client software or in a browser), provide output to the graphical user interfaces, and receive input from the graphical user interfaces. The interface engine 430 can be used to generate audio interfaces (e.g., auditory interfaces) in some embodiments. The audio interface may perform any of the functions of a graphical user interface described herein. The interface engine 430 can be used to provide notifications to one or more client devices and to generally perform one or more operations with respect to the image data in image system 400. The interface engine can communicate with systems outside the image system 400.

A graphical user interface can be generated to display a label for an authorization card that corresponds to an image. For example, the interface engine 430 can receive a request from a user. The request can be a request for a label for an authorization card that is displayed in an image, and the request can include any combination of an image or image information that corresponds to the image. The interface engine 430 can provide the information in the request to the management engine 420, and the management engine can process the image in response to the request.

An audio interface can provide output via speakers and receive input via microphones. An audio interface and a graphical user interface can be presented concurrently, and for example, a speaker can play a description of each element in the graphical user interface as a user navigates through the graphical user interface. In a concurrent audio and graphical user interface, input can be provided as audio or by selecting elements within the interface.

In at least one embodiment, the image system 400 can include a model engine 440. The model engine 440 can be used to implement a machine learning model including the machine learning model that is described with reference to FIG. 3. The model engine 440 can provide input to a machine learning model and receive output from the model. In addition, the model engine 440 can include the architecture for training a machine learning model that is described with reference to FIG. 2. Generally, the model engine 440 can be used to compare image data 403 to one or more rules, to train a machine learning model, or to use a machine learning model to classify image data (e.g., to classify the image as including a particular authorization card). For example, the model engine 440 can request and receive any combination of images and image information for classification from the management engine 420 via the interface engine 430.

The model engine 440 can quantity classified with one or more machine learning models. A feature vector can be generated for each image. For example, the feature vector for an image can include numeric representations of any combination of information about the image. For example, the feature vector can include information about the color for some or all of the pixels in the image (e.g., the red, green, and blue value for each pixel), average colors for groups of pixels (e.g., the mean, median, or mode for the red, green, and blue value for a group of pixels), color distribution for groups of pixels (e.g., a standard deviation or a histogram for the red, green, and blue value for a group of pixels). As described above, the feature vectors can be used to train a machine learning model or to receive a classification (e.g., label for an authorization card) for the image represented by the feature vector.

In at least one embodiment, the image system 400 can communicate with user device(s) 450. For example, a user device 450 can be user device 102 or user device(s) 108. Communication between image system 400 and the user device(s) 450 can occur via the interface engine 430. For example, image data can be received from the user device(s) 450 via the interface engine 430.

In at least one embodiment, the image system 400 can communicate with external service(s) 460. For example, an external service 460 can be a service that provides remote assistance to visually impaired users. For example, the service can establish a video call, phone call, or text thread with a volunteer who can help answer questions about image data 403. The image system 400 can call an application programming interface of an external service 460 to establish communication between the user device that captured image data 403 and a user device from the external service (e.g., a user device of a volunteer). The call to the application programming interface can include requesting an address of a user device or providing an address of a user device.

Figure 5:
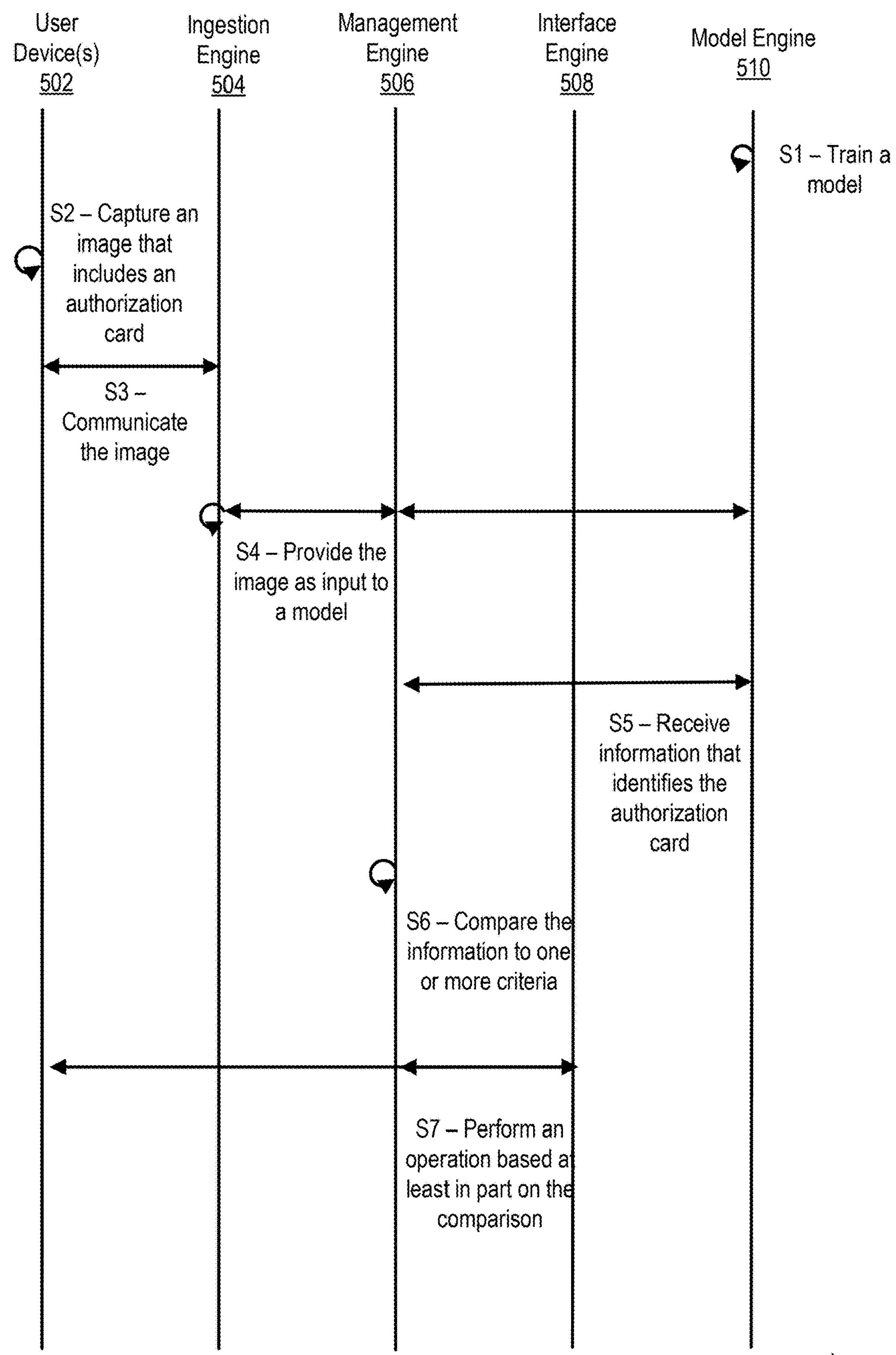
FIG. 5 is a sequence diagram showing a technique for object identification according to at least one embodiment.

FIG. 5 is a sequence diagram 500 showing a technique for object identification according to various embodiments. At S1, a model can be trained by model engine 510. The model can be trained to assign a card label to an image that depicts a corresponding authorization card.

At S2, a user device 502 can capture an image, and for example, the image may be captured by a camera of the user device. In some embodiments, the image may be accessed from the memory of the user device 502. In some embodiments, the image can be captured via an interface that is provided to the user device 502 by an interface engine 508. Capturing the image may include generating a feature vector for the image. The feature vector may be generated by a pretrained machine learning model that has been trained to extract features from an image. This model can execute on user device 502, and a user device can be a mobile device such as a smartphone, tablet computer, laptop computer, and/or a wearable device. The following reference is incorporated for all purposes and the reference includes more details about feature extraction for images: Kumar, Gaurav, and Pradeep Kumar Bhatia. "A detailed review of feature extraction in image processing systems." 2014 Fourth international conference on advanced computing & communication technologies. IEEE, 2014.

At S3, the image from S2 can be communicated from the user device 502 to an ingestion engine 504. The image can include a depiction of an authorization card, and the image can be communicated over a network. In some embodiments, information about the image can be communicated in addition, or as an alternative to, the image. The information can include a feature vector, a target card and/or a current location of the user device 502 in some embodiments.

At S4, the image can be provided as input to the model. In some embodiments, information about the image can be provided to the model in addition to, or as an alternative to, the image. Providing the image as input to the model can mean that the ingestion engine 504 provides the image, and/or the image information, to a model engine 510 that includes the machine learning model. In some embodiments, the image may be provided to the model engine 510 via the management engine 506. The management engine 506 may generate a feature vector using the image and/or image information, and the feature vector may be provided to the model engine 510.

At S5, information that identifies the authorization card that is depicted in the image can be received as output from the machine learning model. The information can be received at the management engine 506 and from the model engine 510. The information can include a predicted card label for the authorization card that is depicted in the image from S2. The information can include a confidence score for the card label (e.g., a confidence that the label is accurate).

At S6, the information from S5 can be compared to one or more criteria. The criteria can include a target card. The target card may be identified by input to the user device's interface and/or the target card may be identified from location information. In some embodiments, comparison to the one or more criteria may be used to determine whether to present an option for establishing a communication channel. The option may be presented in response to a confidence score failing to satisfy the one or more criteria. For example, an option may be presented if the comparison to the one or more criteria suggests that the classification is likely to be inaccurate.

At S7, an operation can be performed. The operation can be based at least in part on the comparison at S6. For example, the operation can include providing a notification via an interface (e.g., a graphical user interface and/or an audio interface), and the notification may be selected based on the comparison. For example, the notification may identify the card label if the confidence score exceeds a threshold. In some embodiments, the notification may indicate that the image includes the target card or the image does not include the target card.

The operations can include presenting an option for establishing a communication channel. Presenting the option may include instructing the interface engine to communicate one or more of a graphical interface and an audio interface to the user device 502, and the option can be presented via one or more interfaces. A response to the option can be received via one or more interfaces in some embodiments. The communication channel may be established in response to input to a graphical interface or audio interface that is executing on the user device 502. The input can select the option to establish the communication channel. The communication channel can be established by calling an application programming interface of an external service. The external service can return an address for a user device that is associated with the external service, and the user device 502 can use the address to establish a communication channel.

Figure 6:
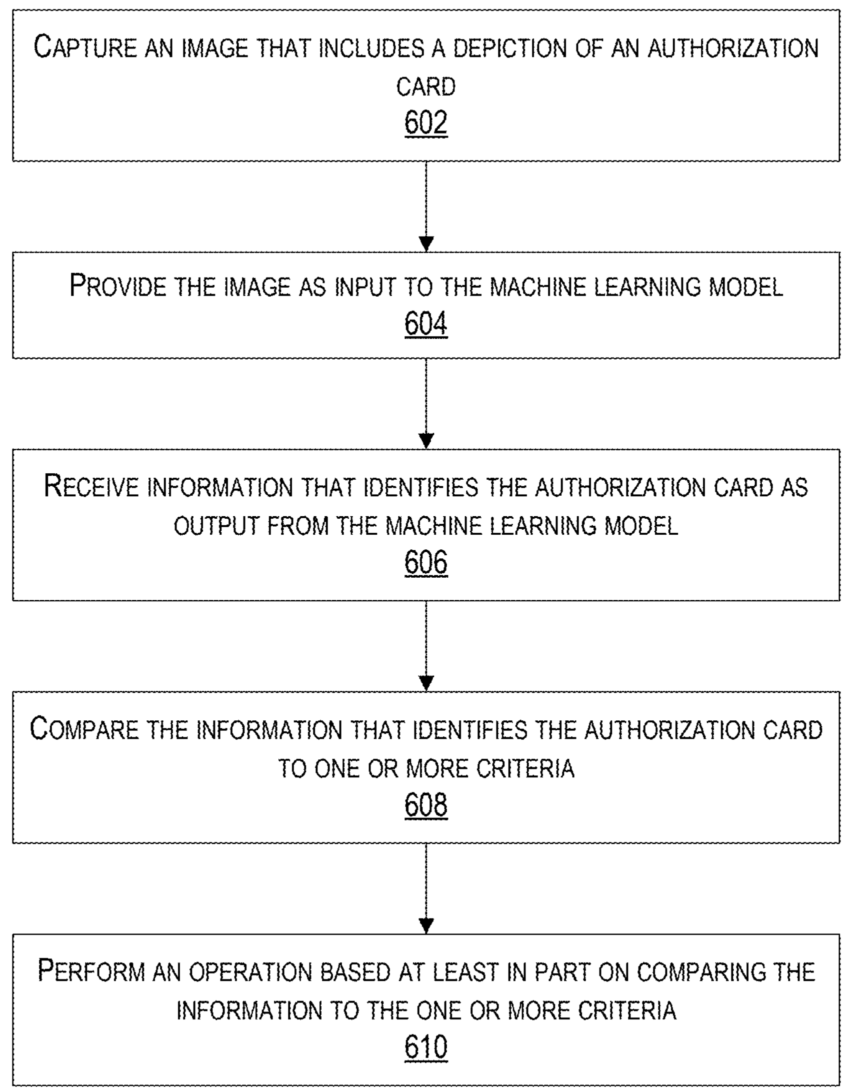
FIG. 6 is a block diagram illustrating an example method for object identification, in accordance with at least one embodiment.

FIG. 6 is a block diagram illustrating an example method 600 for object identification, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. The operations of method 600 may be performed by any suitable portion the Image System 106 of FIG. 1. In some embodiments, method 600 may be executed by components of image system 400 of FIG. 4. In some embodiments, method 600 may be executed by components of Computing Device 800 of FIG. 8. In some embodiments, method 600 may be executed by a mobile device such as user device 102.

At block 602, an image can be captured. The image can be captured by a camera of a mobile device (e.g., a user device), and the image can include a depiction of at least one authorization card. An authorization card can be any card that includes a magnetic stripe and/or a microchip that can provide authentication information to an electronic device (e.g., an ATM or card reader). For example, the authorization card can be a credit card, a debit card, an identification card, a gift card, a ticket card, and an access card (e.g. a hotel key).

In some embodiments, a sequence of images can be captured. A mobile device, or an application executing on a mobile device, can compare the captured images, and the mobile device's interface may provide a notification when the sequence is complete (e.g., the first card in the sequence is detected in a subsequent image).

At block 604, the image can be provided as input to the machine learning model. The image may be provided as information representing the image. The image, or information representing the image, may be communicated to a remote computing device in some embodiments. The information representing the image can be a feature vector that is generated by the mobile device. The remote computing device can be any type of computing device such as a server computer, and the remote computing device can be configured to execute a machine learning model. The machine learning model can receive the image information as input and output a card label that corresponds to the authorization card that is depicted in the image. The information can include a target card in some embodiments, and a target card can be an identifier for a particular authorization card.

The machine learning model can be trained to output a card identity for an input image. The card identity can be an identifier that is assigned to a card via a graphical user interface and/or an audio interface. In some embodiments, information that represents the image may be input to the machine learning model. For example, a feature vector that represents the image may be generated for the image and input to the machine learning model. The model may be trained using any of the techniques described with reference to FIGS. 2-3 and 8.

At block 606, information that identifies the authorization card can be received as output from the machine learning model. The information can be a label and/or a confidence score. The label may be a user assigned label that was assigned to the card by a user during model training. In embodiments where a sequence of images are captured by the mobile device, the information that identifies the authorization card may also identify a position in the sequence that corresponds to each authorization card.

At block 608, the information that identifies the authorization card can be compared with respect to one or more criteria. For example, the information can include a confidence score that can be compared with one or more thresholds. The criteria can include a label of a target card (e.g., a target label) and a label from the information that identifies the authorization card can be compared against the target label. Comparing the information that identifies the authorization card to one or more criteria can include determining a current location for the mobile device. One or more target locations can be accessed, and the target locations may be accessed based at least in part on the information that identifies the authorization card. For example, different authorization cards may be associated with different target locations. The current location can be compared against the target locations. The authorization card may be identified as the target card if the current location matches a target location and the authorization card may not be identified as the target card if the current location does not match a target location.

At block 610, one or more operations can be performed. The operation can be based at least in part on comparing the information that identifies the authorization card to one or more criteria. The operation can include providing a notification that identifies the authorization card (e.g., a label that is associated with the authorization card). The notification can be provided by a speaker of the electronic device, a vibration motor of the electronic device, and/or a display of the electronic device. The notification may indicate that the card identified in the information that identifies the authorization card is not the target authorization card. The operations may include providing a notification comprising instructions to capture a second image that includes a depiction of a second authorization card.

In embodiments where a sequence of images are captured, the operation may include identifying a position in the sequence that corresponds to the target card (e.g., "the credit card is the second card in the sequence"). The sequence may be compared to a previous sequence that was captured by the mobile device and the operations may include a notification that indicates that the cards are in the same sequence. Visually impaired users often keep authorization cards in a particular order so that the user can identify specific cards when they are retrieved from storage. In some embodiments, the target card can be a particular sequence of cards.

The operations can include presenting an option for establishing a communication channel. For example, the option can be presented via a graphical user interface that is displayed on a display of the mobile device. In some embodiments, the option can be presented via an audio interface. In an audio interface, the mobile device can present the option as output from the mobile device's speaker (e.g., "would you like to establish a communication channel). Input to the audio interface can be received via the mobile device's microphone. The option for establishing the communication channel may be presented based at least in part on the comparison at 610.

The communication channel can be established between the mobile device from 602 (e.g., a first mobile device) and a second mobile device. In some embodiments, an address for the second mobile device can be accessed from a contacts list on the first mobile device. For example, the graphical user interface or audio interface from 610 may present an option for selecting a contact for the communication channel. The contacts list may be stored in the memory of the mobile device, and the contacts list may include a preferred contact. If the contact list includes a preferred contact, the communication channel may be established without prompting a user of the first mobile device to identify a specific contact.

In some embodiments, the address for the second mobile device can be retrieved from an external service, and establishing the communication channel can include requesting the address from an application programming interface of the external service. The communication channel can be a phone call (e.g., an audio call), a video call, a text thread, or any other communication channel, and the communication channel can be established over a network such as the internet or a public switched telephone network. The address can be a phone number, an email address, or an internet protocol address. Establishing the communication channel can include providing any combination of the image from 602 and the image information from 604.

Figure 7:
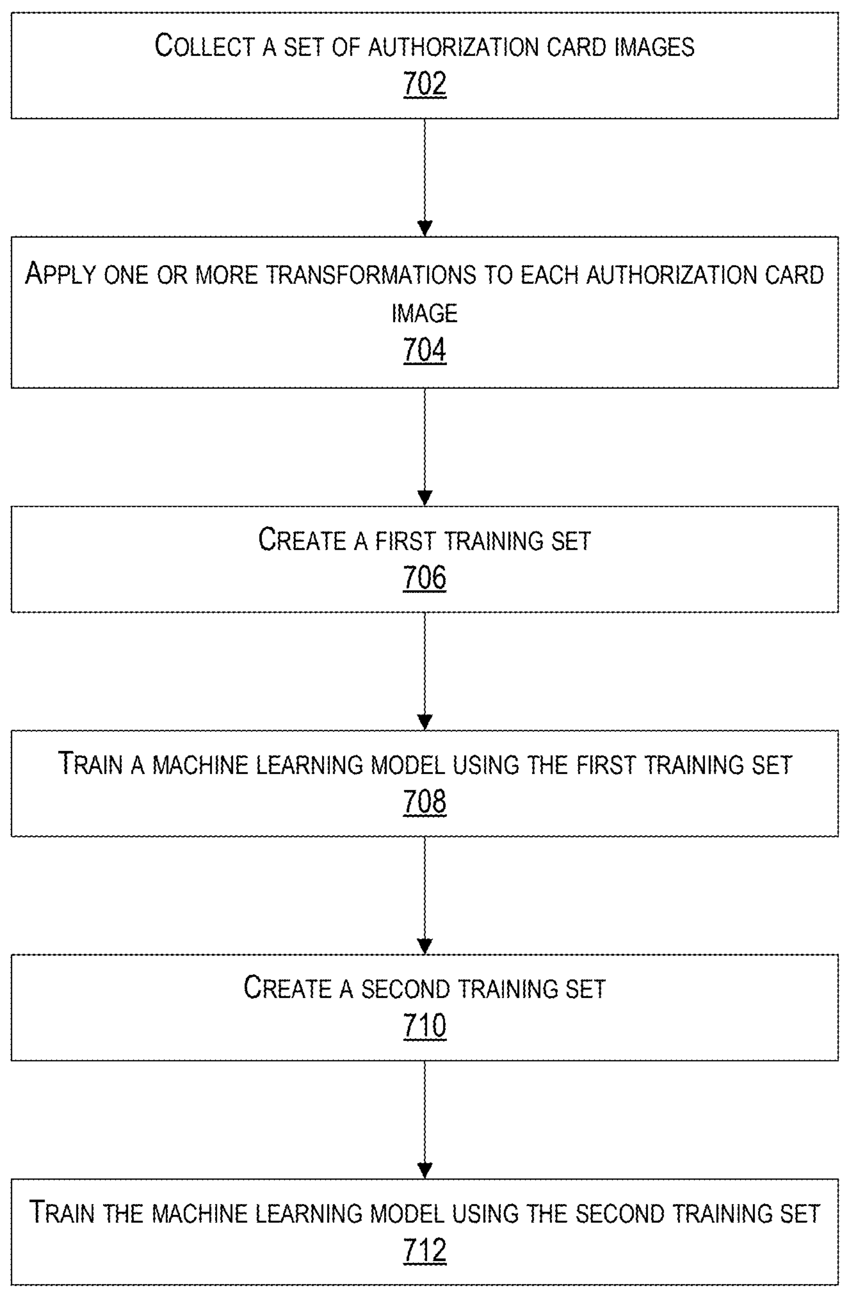
FIG. 7 is a block diagram illustrating an example method for training a machine learning model, in accordance with at least one embodiment.

FIG. 7 is a block diagram illustrating an example method 700 for generating training data in accordance with at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 700 may include additional, or fewer operations than those depicted in FIG. 7. The operations of method 700 may be performed by any suitable portion the image system 106 of FIG. 1. In some embodiments, method 700 may be executed by components of image system 400 of FIG. 4. In some embodiments, method 700 may be executed by components of Computing Device 800 of FIG. 8. In some embodiments, method 600 may be executed by a mobile device such as user device 102.

At block 702, a set of authorization card images can be collected. Collecting the activation card images can include accessing the activation card images from a memory of the mobile device, receiving the access card images from a second electronic device (e.g., a server), and/or capturing the images using the mobile device's camera. An authorization card image can be an image that includes at least a portion of an authorization card. The authorization card images may be labeled images, and an identifier may be assigned to the collected images. The set of authorization card images may be a set of information that represents the authorization card images. For example, the set of images may be a set of feature vectors.

Collecting the set of authorization card images can include generating feature vectors for the images. The feature vector can be an ordered list of numeric properties of the image. For example, some or all of the pixels in the image can be represented in the feature vector as a series of numbers. The numbers that represent the color properties of a pixel can include a red value indicating the intensity of the red component of the pixel's color, a blue value representing the intensity of the blue component of the pixel's color, and a yellow component representing the intensity of the yellow component of the pixel's color. The feature vector can include statistics summarizing the color properties for groups of pixels (e.g., a mean, a median, a mode, and a standard deviation of the yellow value for a group of pixels).

At block 704, one or more transformations can be performed to some or all of the authorization card images. The transformations can include geometric transformations, color space transformations, and randomizing transformations. Any combination of any number of these transformations can be performed on an authorization card image. Geometric transformations can include rotating an image by different angles, flipping an image along an axis, cropping portions of an image, translating an image by shifting the image's position, and/or scaling an image to change its size. Color space transformations can include changing the brightness of an image, increasing the contrast of an image, reducing the contrast of an image, increasing the saturation of the image's colors, and/or decreasing the saturation of the image's colors. Randomizing transformations can include adding random noise to an image, reducing the noise in an image (e.g., smoothing), combining portions of one or more images, and/or randomly erasing a portion of the image.

At block 706, a first training set can be created. The first training set can include any combination of any number of the collected set of authorization card images, the modified authorization card images, and a set of non-authorization card images. Non-authorization card images can be images that do not include a depiction of an authorization card image.

At block 708, the machine learning model can be trained using the first training set. Training the machine learning model can include iteratively updating one or more model parameters until an error metric is minimized (e.g., an R squared metric).

At block 710, a second training set can be created. The second training set can include any combination of any number of the first training set and non-authorization card images that are incorrectly detected as authorization card images after the first round of training. Non-authorization card images can be images that do not include a depiction of an authorization card image. One or more of the images in the first training set may be excluded from the second training set.

At block 712, the machine learning model can be trained using the second training set. Training the machine learning model can include iteratively updating one or more model parameters until an error metric is minimized (e.g., an R squared metric).

Figure 8:
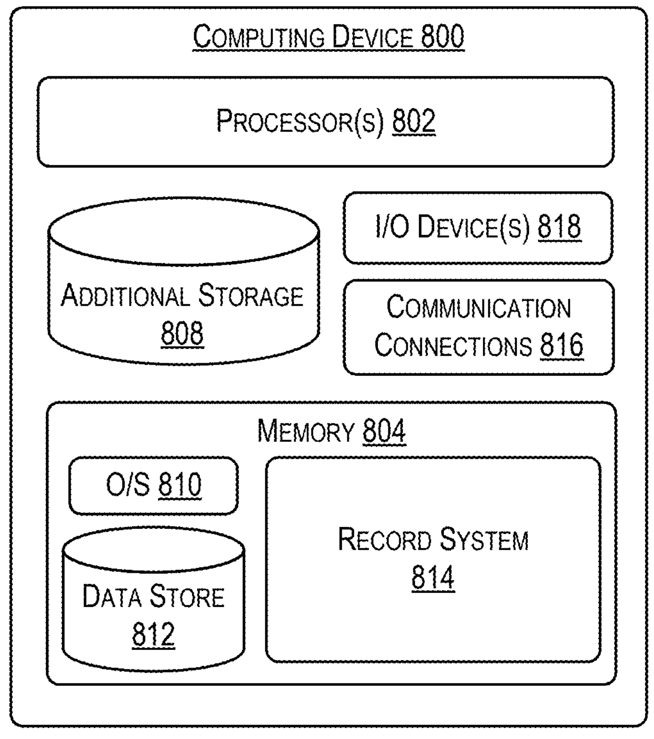
FIG. 8 illustrates an example computing device that may implement the methods disclosed herein.

FIG. 8 illustrates an example computing device 800 that may implement the methods disclosed herein. In some embodiments, the computing device 800 may include one or more processors (e.g., processor(s) 802). The processor(s) 802 may be implemented in hardware, computer-executable instructions, firmware, or combinations thereof. Computer-executable instruction or firmware implementations of the processor(s) 802 may include computer-executable or machine-executable instructions written in any suitable programming language.

Computing device 800 may include memory 804. The memory 804 may store computer-executable instructions that are loadable and executable by the processor(s) 802, as well as data generated during the execution of these programs. The memory 804 may be volatile (such as RAM) and/or non-volatile (such as ROM, flash memory, etc.). The computing device 800 may include additional storage 808, which may include removable storage and/or non-removable storage. The additional storage 808 may include but is not limited to, magnetic storage, optical disks, and/or tape storage. The disk drives and their associated computer-readable media may provide non-volatile storage of computer-readable instructions, data structures, program engines, and other data for the computing devices. In some implementations, the memory 804 or additional storage 808 may individually, or collectively, include multiple different types of memory, such as SRAM, DRAM, or ROM.

The memory 804 and/or additional storage 808 may be examples of computer-readable storage media. Computer-readable storage media may include volatile, non-volatile, removable, or non-removable media implemented in any method or technology for storage of information such as computer-readable instructions, data structures, program engines, or other data. In some embodiments, memory 804 and the additional storage 808 are examples of computer storage media. Memory 804 and/or additional storage 808 may include but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 800. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 804 may include an operating system 810 and one or more data stores 812, and/or one or more application programs, engines, or services for implementing the features disclosed herein, such as the features provided by the image system 814 (an example of the image system 400 of FIG. 4).

The computing device may also contain communications connection(s) 816 that allow the computing device 800 to communicate with a stored database, another computing device, a server, user terminals, and/or other devices (e.g., via one or more networks, not depicted). The computing device may also include I/O device(s) 818, such as a keyboard, a mouse, a pen, a voice input device, a touch input device, a display, speakers, a printer, etc.

Object identification techniques can be used to count money for a visually impaired user. These users may depend on others to count physical bills or coins, and this dependence can mean that visually impaired users are susceptible to exploitation. For example, a sales clerk may steal from a visually impaired user by lying about the amount of money that the salesperson is handing to the user. In addition, it may be difficult for a visually impaired user to conceal that they have a large amount of money if the user has to rely on another person to count their cash.

Instead of relying on others, a visually impaired user may use a mobile device, or other computing device, to capture an image of one or more cards. The image can be transmitted to a service that can perform object identification techniques to determine the number and type of cards in the image. The image can be input to a machine learning model and the model can output information that identifies the cards in the image and/or a confidence score. The system may compare the output against evaluation criteria to determine if the output is reliable. If the output is not reliable, the system can cause an application executing on the mobile device to present an option to make a call to a trusted party. This trusted party may be a contact, or a volunteer at a service such as Be My Eyes, and the party can manually identify the cards for the visually impaired user. The trusted party may be more reliable because they are remote from the visually impaired user and they may not have an opportunity to benefit from lying about card identities.

These techniques can be used to generate training data for a machine learning model. The visually impaired user may capture an image before depositing cash to a bank account, or after a withdrawal from the bank account. The system implementing the machine learning model may have access to the account change information, and training data can be automatically generated by assigning the account change as a label for the image. In addition, the label may be assigned during a call to the trusted party. For example, the image capture techniques, and the call to a trusted party, may occur via a phone application. The application's graphical user interface may present an option for the trusted party to provide the amount of money in the image. This amount of money can be assigned as a label for the image.

The various embodiments further can be implemented in a wide variety of operating environments, which in some cases can include one or more user computers, computing devices, or processing devices that can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art of supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flashcards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:

capturing, by a camera of a mobile device, an image, wherein the image includes a depiction of an authorization card;

generating, by the mobile device, a feature vector corresponding to the image, the feature vector comprising a respective numeric representation of a set of properties of the image;

providing, by the mobile device, the feature vector of the image as an input to a machine learning model, wherein the machine learning model is trained to;

assign a confidence score to the feature vector based on a position of the feature vector in an n-dimensional space relative to one or more known feature vectors, wherein each axis in the n-dimensional space corresponds to a respective property in the set of properties; and output a predicted card label corresponding to the authorization card based on the feature vector;

receiving, by the mobile device, information that identifies the authorization card as an output from the machine learning model, the information that identifies the authorization card comprising the predicted card label;

comparing, by the mobile device, the information that identifies the authorization card to one or more criteria to verify the predicted card label outputted by the machine learning model; and performing, by the mobile device, an operation based at least in part on the comparing of the information that identifies the authorization card to the one or more criteria.

2. The method of claim 1, wherein the operation comprises:

providing, by a speaker of the mobile device, a notification that identifies the authorization card.

3. The method of claim 1, wherein the one or more criteria include a target authorization card, and wherein comparing the information that identifies the authorization card to the one or more criteria comprises:

determining, by the mobile device, that the authorization card is not the target authorization card.

4. The method of claim 3, wherein the operation comprises:

providing, by a speaker of the mobile device, a notification comprising instructions to capture a second image that includes a depiction of a second authorization card.

5. The method of claim 1, wherein the one or more criteria includes one or more target locations for the authorization card, and wherein comparing the information that identifies the authorization card to the one or more criteria comprises:

determining, by the mobile device, a current location;

accessing, by the mobile device, the one or more target locations based at least in part on the information that identifies the authorization card;

comparing, by the mobile device, the current location and the one or more target locations; and determining, by the mobile device, that the mobile device is not at a target location for the authorization card.

6. The method of claim 5, wherein the operation comprises:

providing, by a speaker of the mobile device, a notification comprising instructions to capture a second image that includes a depiction of a second authorization card.

7. The method of claim 1, wherein the training comprises:

collecting a set of authorization card images from a memory of the mobile device;

applying one or more transformations to each authorization card image including mirroring, rotating, smoothing, or contrast reduction to create a modified set of authorization card images;

creating a first training set comprising the collected set of authorization card images, the modified set of authorization card images, and a set of non-authorization card images;

training the machine learning model in a first stage using the first training set;

creating, by the mobile device, a second training set for a second stage of training comprising the first training set and non-authorization card images that are incorrectly detected as authorization card images after the first stage of training; and training the machine learning model in a second stage using the second training set.

8. A mobile device, comprising:

one or more memories; and one or more processors in communication with the one or more memories and configured to execute instructions stored in the one or more memories to perform operations to:

capture, by a camera of the mobile device, an image, wherein the image includes a depiction of an authorization card;

generate, by the mobile device, a feature vector corresponding to the image, the feature vector comprising a respective numeric representation of a set of properties of the image;

provide, by the mobile device, the feature vector of the image as an input to a machine learning model, wherein the machine learning model is trained to;

assign a confidence score to the feature vector based on a position of the feature vector in an n-dimensional space relative to one or more known feature vectors, wherein each axis in the n-dimensional space corresponds to a respective property in the set of properties; and output a predicted card label corresponding to the authorization card based on the feature vector;

receive, by the mobile device, information that identifies the authorization card as an output from the machine learning model, the information that identifies the authorization card comprising the predicted card label;

compare, by the mobile device, the information that identifies the authorization card to one or more criteria to verify the predicted card label outputted by the machine learning model; and perform, by the mobile device, an operation based at least in part on the comparing of the information that identifies the authorization card to the one or more criteria.

9. The mobile device of claim 8, wherein the operation comprises operations to:

provide, by a speaker of the mobile device, a notification that identifies the authorization card.

10. The mobile device of claim 8, wherein the one or more criteria include a target authorization card, and wherein comparing the information that identifies the authorization card to the one or more criteria comprises operations to:

determine, by the mobile device, that the authorization card is not the target authorization card.

11. The mobile device of claim 10, wherein the operation comprises operations to:

provide, by a speaker of the mobile device, a notification comprising instructions to capture a second image that includes a depiction of a second authorization card.

12. The mobile device of claim 8, wherein the one or more criteria includes one or more target locations for the authorization card, and wherein comparing the information that identifies the authorization card to the one or more criteria comprises operations to:

determine, by the mobile device, a current location;

access, by the mobile device, the one or more target locations based at least in part on the information that identifies the authorization card;

compare, by the mobile device, the current location and the one or more target locations; and determine, by the mobile device, that the mobile device is not at a target location for the authorization card.

13. The mobile device of claim 12, wherein the operation comprises operations to:

provide, by a speaker of the mobile device, a notification comprising instructions to capture a second image that includes a depiction of a second authorization card.

14. The mobile device of claim 8, wherein the training comprises operations to:

collect a set of authorization card images from a memory of the one or more memories of the mobile device;

apply one or more transformations to each authorization card image including mirroring, rotating, smoothing, or contrast reduction to create a modified set of authorization card images;

create a first training set comprising the collected set of authorization card images, the modified set of authorization card images, and a set of non-authorization card images;

train the machine learning model in a first stage using the first training set;

create a second training set for a second stage of training comprising the first training set and non-authorization card images that are incorrectly detected as authorization card images after the first stage of training; and train the machine learning model in a second stage using the second training set.

15. A non-transitory computer-readable medium storing a plurality of instructions that, when executed by one or more processors of a mobile device, cause the one or more processors to perform operations to:

capture, by a camera of the mobile device, an image, wherein the image includes a depiction of an authorization card;

generate, by the mobile device, a feature vector corresponding to the image, the feature vector comprising a respective numeric representation of a set of properties of the image;

provide, by the mobile device, the feature vector of the image as an input to a machine learning model, wherein the machine learning model is trained to:

assign a confidence score to the feature vector based on a position of the feature vector in an n-dimensional space relative to one or more known feature vectors, wherein each axis in the n-dimensional space corresponds to a respective property in the set of properties; and output a predicted card label corresponding to the authorization card based on the feature vector;

receive, by the mobile device, information that identifies the authorization card as an output from the machine learning model, the information that identifies the authorization card comprising the predicted card label;

compare, by the mobile device, the information that identifies the authorization card to one or more criteria to verify the predicted card label outputted by the machine learning model; and perform, by the mobile device, an operation based at least in part on the comparing of the information that identifies the authorization card to the one or more criteria.

16. The non-transitory computer-readable medium of claim 15, wherein the operation comprises operations to:

provide, by a speaker of the mobile device, a notification that identifies the authorization card.

17. The non-transitory computer-readable medium of claim 15, wherein the one or more criteria include a target authorization card, and wherein comparing the information that identifies the authorization card to the one or more criteria comprises operations to:

determine, by the mobile device, that the authorization card is not the target authorization card.

18. The non-transitory computer-readable medium of claim 17, wherein the operation comprises operations to:

provide, by a speaker of the mobile device, a notification comprising instructions to capture a second image that includes a depiction of a second authorization card.

19. The non-transitory computer-readable medium of claim 15, wherein the one or more criteria includes one or more target locations for the authorization card, and wherein comparing the information that identifies the authorization card to the one or more criteria comprises operations to:

determine, by the mobile device, a current location;

access, by the mobile device, the one or more target locations based at least in part on the information that identifies the authorization card;

compare, by the mobile device, the current location and the one or more target locations; and determine, by the mobile device, that the mobile device is not at a target location for the authorization card.

20. The non-transitory computer-readable medium of claim 19, wherein the operation comprises operations to:

provide, by a speaker of the mobile device, a notification comprising instructions to capture a second image that includes a depiction of a second authorization card.

* * * * *